(12) United States Patent
Shinto

(10) Patent No.: US 9,279,925 B2
(45) Date of Patent: Mar. 8, 2016

(54) INTERFERENCE FILTER, OPTICAL MODULE, AND ELECTRONIC APPARATUS

(71) Applicant: Seiko Epson Corporation, Tokyo (JP)

(72) Inventor: Susumu Shinto, Suwa-gun (JP)

(73) Assignee: Seiko Epson Corporation (JP)

( * ) Notice: Subject to any disclaimer, the term of this patent is extended or adjusted under 35 U.S.C. 154(b) by 276 days.

(21) Appl. No.: 13/762,533

(22) Filed: Feb. 8, 2013

(65) Prior Publication Data

US 2013/0214123 A1    Aug. 22, 2013

(30) Foreign Application Priority Data

Feb. 16, 2012  (JP) .................................. 2012-031441

(51) Int. Cl.
| | | |
|---|---|---|
| *G02B 5/28* | (2006.01) | |
| *G02B 26/00* | (2006.01) | |
| *G01J 1/04* | (2006.01) | |
| *G01J 3/26* | (2006.01) | |
| *G01J 3/51* | (2006.01) | |

(52) U.S. Cl.
CPC ................ *G02B 5/28* (2013.01); *G01J 1/0488* (2013.01); *G01J 3/26* (2013.01); *G01J 3/51* (2013.01); *G02B 5/284* (2013.01); *G02B 26/001* (2013.01)

(58) Field of Classification Search
CPC ............. C03C 17/36; G01J 3/26; G01J 3/51; G01J 1/0488; G02B 1/00; G02B 1/10; G02B 5/28; G02B 5/281–5/285; G02B 26/001; G02B 6/29358; G02B 26/002
USPC ......... 359/359–360, 577–579, 585, 260–261; 356/450, 451, 454, 505, 506, 519; 427/69, 453, 455, 473, 475, 497, 509, 427/526, 527, 528, 529, 531, 533, 535, 537, 427/545, 555, 556, 562, 567, 569
See application file for complete search history.

(56) References Cited

U.S. PATENT DOCUMENTS

| | | | | |
|---|---|---|---|---|
| 4,218,532 A | * | 8/1980 | Dunkleberger | ............... 430/314 |
| 4,337,990 A | * | 7/1982 | Fan et al. | ...................... 359/360 |
| 4,853,080 A | * | 8/1989 | Anthony | ......................... 216/22 |
| 5,510,173 A | * | 4/1996 | Pass et al. | ..................... 428/216 |

(Continued)

FOREIGN PATENT DOCUMENTS

| | | |
|---|---|---|
| JP | S62-049335 | 3/1987 |
| JP | 11-142752 | 5/1999 |

(Continued)

OTHER PUBLICATIONS

Donald M. Mattox, Handbook of Physical Vapor Deposition (PVD) Processing, 2010, Elsevier, Second Edition, p. 49.*

(Continued)

*Primary Examiner* — Kimberly N Kakalec
(74) *Attorney, Agent, or Firm* — Harness, Dickey & Pierce, P.L.C.

(57) ABSTRACT

An interference filter includes a first substrate, a second substrate opposed to the first substrate, a first optical film provided to the first substrate, and a second optical film provided to the second substrate and opposed to the first optical film, at least one of the first and second optical films has a metal film having a reflecting property and a transmitting property with respect to light in a desired wavelength band, a surface and an edge portion of the metal film are covered by a barrier film, and the barrier film is formed of a material having conductivity.

9 Claims, 7 Drawing Sheets

(56) References Cited

U.S. PATENT DOCUMENTS

| | | | |
|---|---|---|---|
| 5,798,027 A * | 8/1998 | Lefebvre et al. | 204/192.26 |
| 6,436,541 B1 * | 8/2002 | Sopko et al. | 428/432 |
| 7,440,204 B2 | 10/2008 | Kunii | |
| 2009/0306479 A1 | 12/2009 | Kamihara | |
| 2010/0302660 A1 * | 12/2010 | Hirokubo et al. | 359/850 |
| 2011/0116162 A1 * | 5/2011 | Tsujimura et al. | 359/359 |
| 2011/0176128 A1 * | 7/2011 | Matsuno | 356/519 |
| 2011/0222159 A1 * | 9/2011 | Yamazaki | 359/589 |
| 2011/0255166 A1 * | 10/2011 | Shinto et al. | 359/577 |
| 2012/0019812 A1 | 1/2012 | Shinto et al. | |
| 2012/0019827 A1 * | 1/2012 | Shinto et al. | 356/416 |
| 2012/0044491 A1 | 2/2012 | Urushidani et al. | |

FOREIGN PATENT DOCUMENTS

| | | |
|---|---|---|
| JP | 2002-243937 | 8/2002 |
| JP | 2004-053852 | 2/2004 |
| JP | 2006-084994 | 3/2006 |
| JP | 2008-076749 | 4/2008 |
| JP | 2008-151544 | 7/2008 |
| JP | 2009-251105 | 10/2009 |
| JP | 2011-008225 | 1/2011 |
| JP | 2012-027224 | 2/2012 |
| JP | 2012-027226 | 2/2012 |
| JP | 2012-042584 | 3/2012 |
| JP | 2012-042584 A | 3/2012 |
| JP | 2012-173315 | 9/2012 |
| JP | 2012-247472 | 12/2012 |

OTHER PUBLICATIONS

Donald M. Mattox, Handbook of Physical Vapor Deposition (PVD) Processing, 2010, William Andrew (Elsevier), Second Edition, p. 49.*

* cited by examiner

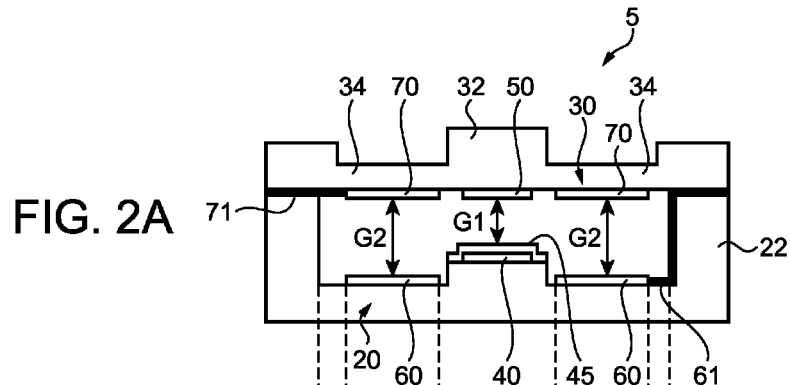
FIG. 2A
FIG. 2B
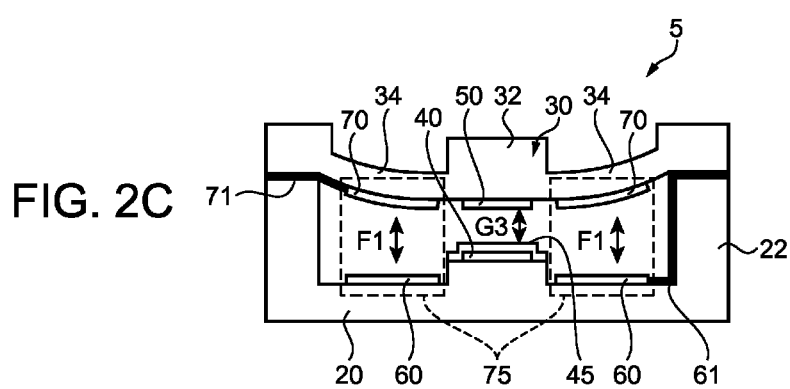
FIG. 2C

INTERFERENCE FILTER, OPTICAL MODULE, AND ELECTRONIC APPARATUS

BACKGROUND

1. Technical Field

The present invention relates to an interference filter, an optical module, and an electronic apparatus.

2. Related Art

In the past, there has been known a variable wavelength interference filter used as an interference filter capable of causing multiple interference in the light between a pair of optical reflection films to thereby emit the light with a desired wavelength (see, e.g., JP-A-2008-76749 (Document 1)).

The variable wavelength interference filter described in Document 1 has substrates disposed so as to be opposed to each other, and the optical reflection films are respectively disposed on the surfaces of the respective substrates, the surfaces being opposed to each other. Further, the distance between the optical reflection films can be controlled, and it becomes possible to take out the light having the wavelength corresponding to the gap dimension between the optical reflection films from the incident light.

For the optical reflection film (hereinafter also referred to simply as an optical film) in such a variable wavelength interference filter, metal films and dielectric multilayer films can be used. It is preferable for the optical film to have both of superior reflectance characteristics and transmissivity in the wavelength range of the light used therein, and taking this condition into consideration, silver (Ag) with small film thickness could be a strong candidate of the metal film. However, silver has low heat resistance, and is easily sulfurized, and thus there is a concern about the low long-term reliability of silver.

Here, there has been proposed a technology of using an alloy thin film consisting primarily of silver for the optical film to thereby improve the reliability (see, e.g., JP-A-2009-251105 (Document 2)).

In Document 2, the optical film is formed of an alloy film of silver including carbon.

Further, an accumulation of static electricity may sometimes occur in the optical film in the variable wavelength interference filter, and in some cases, the control of the gap dimension between the optical films becomes difficult due to the accumulation of static electricity.

Here, there has been proposed a technology of providing a carbon film on the surface of the optical film to thereby improve the abrasion resistance and the antistatic property (see, e.g., JP-A-2006-84994 (Document 3)).

A neutral density (ND) filter of Document 3 used for an imaging system such as a camera or a video camera has a configuration of alternately stacking $SiO_2$ and Ti metal compound, and further stacking a carbon film superior in the abrasion resistance and the antistatic property as the outermost layer thereof.

Regarding the variable wavelength interference filter of Document 1, the optical film is exposed to various chemicals or gasses in the manufacturing process performed after the optical film is formed, and is therefore easy to be deteriorated. In particular, in the case of using silver for the optical film, the deterioration is easy to occur.

In order to cope with the problem, according to Document 2, the optical films in the interference filter are formed of alloy films including carbon. By alloying silver, the resistance of silver to sulfurization and so on can be improved. However, in the long-term reliability, there is a concern about deterioration in characteristics. Therefore, it is difficult to solve the problem of the deterioration in the characteristics of the optical film only by the alloying, and therefore, some measures for preventing the deterioration in the characteristics of the optical film become necessary.

Further, although in Document 3 it is possible to prevent the accumulation of static electricity to some extent by incorporating carbon into the outermost layer of the ND filter, since the carbon film is in an electrically floating state, the complete elimination of the accumulation of static electricity is not possible. Further, although the upper surface of the ND filter is covered by the carbon film, the end surfaces (the side surfaces) thereof are exposed. Therefore, it results that the end surfaces are exposed to various chemicals or gasses in the manufacturing process, and the filter might be deteriorated.

SUMMARY

An advantage of some aspects of the invention is to prevent a metal film as an optical film from being deteriorated by oxidation, sulfurization, and so on, and further to prevent an accumulation of static electricity of the surface of the optical film.

The invention can be implemented as the following forms or application examples.

Application Example 1

This application example is directed to an interference filter including a first optical film and a second optical film opposed to each other across a gap, at least one of the first and second optical films has a metal film, and a surface and an edge portion of the metal film are covered by a barrier film having conductivity.

According to this application example, by covering the surface and the end portion of the metal film with the barrier film, it becomes possible to block a gas and so on to be the causes of degradation of the reflectance of the metal film such as oxygen, water, or sulfur. Therefore, deterioration of characteristics of the optical film can be prevented.

Further, since the barrier film has the conductivity, it becomes possible to release the charge accumulated on the optical films through the barrier film. Thus, it becomes possible to control the gap between the first optical film and the second optical film with good accuracy. This has been thought to be difficult to control due to the build-up of static electricity.

Application Example 2

In the interference filter according to the above application example, it is preferable that a resistivity of the barrier film is one of equal to and lower than $8 \times 10^7$ Ω·cm.

According to this application example, the resistivity of the barrier film is set to be equal to or lower than $8 \times 10^7$ Ω·cm. Since the resistivity is equal to or lower than $8 \times 10^7$ Ω·cm, it becomes possible to efficiently release the charge to the outside, and the barrier film is superior in antistatic property. Thus, it becomes possible to control the gap between the first optical film and the second optical film with good accuracy.

Application Example 3

In the interference filter according to the above application examples, it is preferable that a material of the metal film is one of Ag alone and an alloy including Ag as a principal component, and the barrier film is one of a film including one or a plurality of substances selected from a group consisting of indium-based oxides, tin-based oxides, and zinc-based oxides as a principal component, and a layered film obtained by stacking films each including a substance selected from the group as a principal component.

According to this application example, as the candidates of the metal film exerting the reflecting and transmitting properties of the light, the material is preferably either one of Ag alone and the alloy including Ag as a principal component.

Further, by using a film made of one or a plurality of substances selected from a group consisting of indium-based oxides, tin-based oxides, and zinc-based oxides, or a layered film composed of films each including a substance selected from the group as the barrier film, there is an advantage of preventing the entry of the gasses causing oxidation or sulfuration of the optical film made of Ag alone or an alloy including Ag as a principal component. Further, since these barrier films also have a heat resistance property, deterioration of the metal film can be prevented, and further, since the light transmissivity is also provided, the barrier films are difficult to be the factors for degrading the optical characteristics. Further, since these barrier films have the conductivity, it is possible to release the charges accumulated on the optical films.

Application Example 4

In the interference filter according to the above application examples, it is preferable that the barrier film is a film including either one of indium tin oxide, Al doped zinc oxide, Ga doped zinc oxide, Ce doped indium oxide, zinc oxide, and tin oxide as a principal component.

According to this application example, since a film called as a transparent conductive film including either one of indium tin oxide (Sn doped indium oxide), Al doped zinc oxide, Ga doped zinc oxide, Ce doped indium oxide, zinc oxide, and tin oxide as a principal component is used as the barrier film, the barrier film is difficult to be the factor for degrading the optical characteristics, capable of preventing the deterioration of the metal film, and of releasing the charges accumulated on the optical films.

Application Example 5

In the interference filter according to the above application examples, it is preferable that the barrier film is electrically connected to the ground.

According to this application example, since the barrier film is electrically connected to the ground, it is possible to release the charges accumulated on the optical film to thereby prevent the accumulation of static electricity of the surface of the optical film.

Application Example 6

In the interference filter according to the above application examples, it is preferable that a tilted surface is provided to an edge portion of the metal film, and the barrier film is formed on the tilted surface.

According to this application example, the tilted surface is provided to the edge portion (an end portion) of the metal film. The thickness of the barrier film tends to be thinner in the vicinity of the edge portion of the metal film. The covering property of the barrier film is improved by providing a tapered shape to the edge portion (the end portion) of the metal film. Therefore, it is possible to prevent the problem that in the vicinity of the edge portion of the metal film, the metal film is exposed, or the thickness of the barrier film becomes extremely thin. As described above, the metal film is covered by the barrier film not only in the surface but also in the edge portion. Therefore, the degradation of the reflectance due to the deterioration (e.g., oxidization and sulfurization) of the metal film can be prevented. Therefore, it becomes possible to maintain the function as the optical film having the transmitting property in the interference filter for a longer period of time compared to the case in which the metal film is exposed.

Application Example 7

In the interference filter according to the above application examples, it is preferable that at least one of the first and second optical films includes the metal film, and another optical film on which the metal film is mounted, and an area of the metal film in a plan view viewed from a thickness direction of one of the first and second optical films is smaller than an area of the another optical film, a step is formed between the metal film and the another optical film, and the barrier film is formed so as to cover the step.

There are some cases in which a dielectric film as another optical film is disposed under the metal film for the purpose of, for example, improving the reflectance. In this case, the total thickness of the overall optical films becomes thicker, and there is a possibility of degrading the covering property of the dielectric film as the barrier film in particular in the edge portion. Therefore, in this application example, the area of the metal film is set to be smaller than the area of the dielectric film, and further, the metal film is disposed inside the dielectric film in the plan view described above. Thus, a step-like bump is formed. Therefore, the coverage of the barrier film in a bump section is improved, and the problem that the edge portion of the metal film is exposed is made difficult to occur.

Application Example 8

In the interference filter according to the above application examples, it is preferable that the first optical film is provided to a first substrate, the second optical film is provided to a second substrate, the first substrate has a first electrode, the second substrate has a second electrode, and a gap between the first optical film and the second optical film is variably controlled by an electrostatic force generated between the first electrode and the second electrode.

As described above, the metal film is covered by the barrier film not only in the surface but also in the edge portion. Therefore, the degradation of the reflectance due to the deterioration (e.g., oxidization and sulfurization) of the metal film can be prevented. Therefore, it becomes possible to maintain the function as the optical film in a variable wavelength interference filter having the gap between the first and second optical films variable for a longer period of time compared to the case in which the metal film is exposed.

Application Example 9

This application example is directed to an optical module including the interference filter according to either one of the application examples described above, and a detection section adapted to detect alight intensity of light transmitted through the interference filter.

According to this application example, an optical module having the optical film the characteristics of which are prevented from being deteriorated, and having high reliability can be realized. For example, the optical module can be used as a detection section (including a light receiving optical system and a light receiving element) of a spectrometric instrument.

Application Example 10

This application example is directed to an electronic apparatus including the interference filter according to any one of the application examples described above, a detection section adapted to detect a light intensity of light transmitted through the interference filter, and a processing section adapted to perform an analysis processing based on the light intensity of the light detected by the detection section.

According to this application example, an electronic apparatus having the optical film the characteristics of which are prevented from being deteriorated, and having high reliability can be realized. The processing section performs a predetermined signal processing based on a signal (light reception signal) obtained from the detection section to thereby measure a spectrophotometric distribution of a sample, for example. By measuring the spectrophotometric distribution, the colorimetry of the sample, the composition analysis of the sample can be performed.

BRIEF DESCRIPTION OF THE DRAWINGS

The invention will now be described with reference to the accompanying drawings, wherein like numbers reference like elements.

FIGS. 2A through 2C are diagrams for explaining a specific structure and an action of a variable wavelength interference filter according to the first embodiment.

DESCRIPTION OF EXEMPLARY EMBODIMENTS

Hereinafter, some preferred embodiments of the invention will be described in detail. It should be noted that the below-described embodiments do not unreasonably limit the content of the invention as set forth in the appended claims, and all of the constituents set forth in the below embodiments are not necessarily essential as means of the invention for solving the problems.

First Embodiment

Figure 1A:
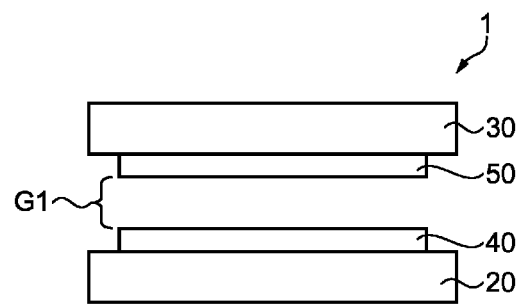
FIGS. 1A through 1D are diagrams showing a structure of an optical film of an interference filter according to a first embodiment of the invention.

FIGS. 1A through 1D are diagrams showing an example of the structure of an optical film in an interference filter. As shown in FIG. 1A, an interference filter 1 has a first substrate 20 and a second substrate 30 held in parallel to each other, a first optical film 40 disposed on the first substrate 20, and a second optical film 50 disposed on the second substrate 30. The first substrate 20 or the second substrate 30 is, for example, a glass substrate having transmissivity with respect to the light in a desired wavelength band.

Further, the first optical film 40 and the second optical film 50 are formed so as to be opposed to each other and have a predetermined gap G1 therebetween. It should be noted that it is possible to make the gap G1 variable, and such a variable wavelength interference filter (hereinafter also referred to as an etalon) will be described later. The first optical film 40 and the second optical film 50 are provided with both of a reflecting property and a transmitting property with respect to the light in the desired wavelength band, and each constitute an optical film in the interference filter 1.

In this embodiment, at least one of the first optical film 40 and the second optical film 50 has a metal film. The metal film can be a film made of a single metal, or a film made of an alloy of metals. For example, a thin film made of silver or an alloy thereof is promising as a candidate of the first optical film 40 and the second optical film 50. However, since the thin film is inferior in heat resistance and environment resistance, measures to counteract deterioration of characteristics are required. In particular, in the manufacturing process of the etalon, exposure to heat loads and chemical solutions, are factors for causing the deterioration in the characteristics of the metal film. It is important to prevent the deterioration in the characteristics due to such factors.

Figure 1B:
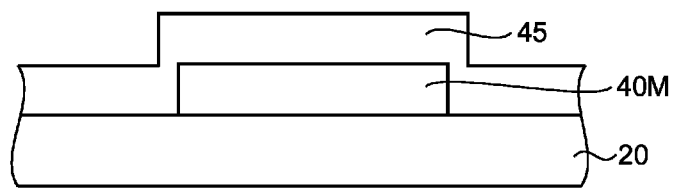
Figure 1C:
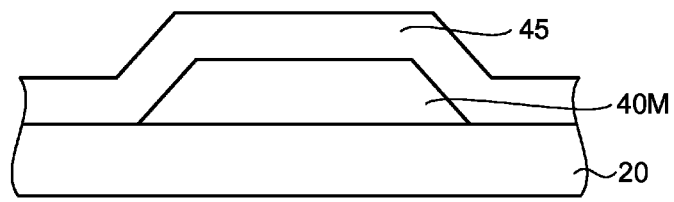
Figure 1D:
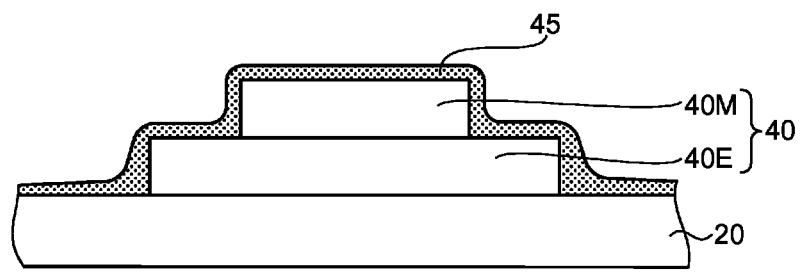

Therefore, in this embodiment, as shown in FIGS. 1B through 1D, there is adopted a structure in which the surface and an edge portion (an end portion) of a metal film 40M is covered by a barrier film (or a protective film) 45. In other words, an optical film structure having the barrier film 45 is adopted in this embodiment. This optical film structure can be applied to at least one of the first optical film 40 and the second optical film 50. In the following explanation, the first optical film 40 formed on the first substrate 20 is taken as an example.

In the example shown in FIG. 1B, the metal film 40M as a constituent of the first optical film is formed on the first substrate 20 such as a quartz glass substrate. Further, the surface and the edge portion of the metal film 40M are covered by the barrier film 45. After patterning the metal film 40M, not only the surface of the metal film 40M but also the part further including the edge portion (the end portion) thereof is covered by the barrier film 45 to thereby make it possible to form the optical film structure shown in FIG. 1B. In such a manner as described above, the first optical film having the metal film 40M covered by the barrier film 45 is formed.

According to this optical film structure, the metal film 40M is covered and protected by the barrier film 45 not only in the surface but also in all of the edge portions. Therefore, offending substances such as oxygen, water, or sulfur degrading the characteristics (e.g., reflectivity) of the metal film 40M are blocked, and therefore, fail to reach the metal film 40M. Therefore, the deterioration of the characteristics of the metal film 40M can be prevented.

Further, the barrier film 45 has electrical conductivity, and the structure in which the barrier film 45 is connected to the ground via wiring (not shown) is adopted. Further, the resistivity of the barrier film is set to be equal to or lower than $8 \times 10^7$ $\Omega \cdot cm$. Since the resistivity is equal to or lower than the value described above, charges are easy to be released outside, and the barrier film 45 is superior in antistatic property. Thus, it is possible to easily release the charges on the surface of the optical film.

Here, as the material of the metal film 40M, Ag (silver) alone and alloys consisting primarily of Ag (silver) are promising candidates of the material of the optical film.

It should be noted that as the alloy including Ag as a principal constituent, there can be used, for example, a silver-samarium-copper alloy (AgSmCu), silver-carbon alloy (AgC), a silver-bismuth-neodymium alloy (AgBiNd), a silver-palladium-copper alloy (AgPdCu), a silver-gold alloy (AgAu), a silver-copper alloy (AgCu), and a silver-copper-gold alloy (AgCuAu).

Further, as the barrier film 45, there can be used a film made of one or a plurality of substances selected from a group consisting of indium-based oxides, tin-based oxides, and zinc-based oxides, or a layered film composed of films including a substance selected from the group described above.

Specifically, an indium-based oxide such as indium tin oxide (Sn doped indium oxide; ITO), or Ce doped indium oxide (ICO), a tin-based oxide such as tin oxide ($SnO_2$), and a zinc-based oxide such as Al doped zinc oxide (AZO), Ga doped zinc oxide (GZO), or zinc oxide (ZnO), and so on are used. Further, indium zinc oxide (IZO; registered trademark) composed of an indium-based oxide and a zinc-based oxide and so on are also used.

The films made of such materials are called a transparent conductive film, and have light transmissivity and a property of conducting electricity.

Further, these materials have an effect of blocking a gas causing oxidization, sulfurization, and so on, heat resistance, and light transmissivity, and can therefore function as the barrier film 45 for the metal film 40M. Further, the materials described above have good adhesiveness with Ag and Ag alloys, and are reliable as the optical film.

The materials of the metal film 40M and the barrier film 45 explained hereinabove can similarly be applied to the embodiments explained below.

Further, if the barrier film 45 is formed on the metal film 40M, it is preferable not to raise the temperature in the manufacturing process so high. Thus, it is possible to prevent recrystallization of the metal film 40M, and degradation of the reflectance. Further, it is preferable not to form the barrier film 45 so thick (to form so as to have a small thickness). If the thickness of the barrier film 45 is large, in the case of, for example, using the etalon as a spectroscope, an unnecessary peak might appear in a spectral intensity distribution in some cases to thereby narrow the bandwidth of a wavelength band in which the dispersion can be performed. Therefore, it is preferable to form the barrier film 45 so as to have a film thickness as thin as possible. For example, in the case of the metal film 40M having a film thickness of 50 nm, it is preferable to form the barrier film 45 so as to have a film thickness equal to or smaller than 20 nm.

Further, in the example shown in FIG. 1C, the covering property of the barrier film 45 in the vicinity of the edge portion of the metal film 40M is improved. Specifically, in the example shown in FIG. 1C, a tilted surface (a tapered surface) is provided to the edge portion of the lone metal film 40M, and the barrier film 45 is formed on the tilted surface.

Since the edge portion of the metal film 40M is generally provided with an angle approximated to a right angle by the etching process alone, if the barrier film 45 is formed thereon, the thickness of the barrier film 45 tends to be thinner in the vicinity of the edge portion of the metal film 40M. The covering property of the barrier film 45 is improved by providing the tapered shape to the edge portion (the end portion) of the metal film 40M. Therefore, the film thickness of the barrier film 45 in the vicinity of the edge portion (the end portion) of the metal film 40M is stable without a variation similarly to the film thickness thereof on the surface of the metal film 40M. Therefore, the reliability of the barrier film 45 is improved compared to the case in which the edge portion of the metal film 40M is provided with a right angle by the etching process. Therefore, it is possible to prevent the problem that in the vicinity of the edge portion of the metal film 40M, the metal film is exposed, or the thickness of the barrier film 45 becomes extremely small to thereby degrade the barrier property. As described above, according to the example shown in FIG. 1C, it is possible to obtain the preferable coverage of the edge portion while reducing the film thickness of the barrier film 45.

Further, as the method of forming the tilted surface (the tapered surface) in the edge portion of the metal film 40M, the following method, for example, can be adopted. For example, the Ag material is sputtered in the condition in which a metal mask is mounted on the first substrate 20. On this occasion, the tilted surface is formed as a result due to a wrap-around phenomenon of the Ag material in an opening section of the mask.

In the example shown in FIG. 1D, a dielectric film (a dielectric multilayer film can also be adopted) 40E as another optical film is disposed under the metal film 40M for the purpose of improving the reflectance of the light. In other words, the dielectric film 40E as a constituent of the first optical film is formed between the metal film 40M as a constituent of the first optical film and the first substrate 20. In the case of adopting this structure, if the area of the metal film 40M in a plan view viewed from the thickness direction of the first substrate 20 is made to coincide with the area of the dielectric film 40E, the total film thickness of the entire first optical film is large, and therefore there is a possibility of degrading the covering property of the barrier film 45 in particular in the edge portion. In order to prevent this problem, it is required to increase the film thickness of the barrier film 45, which might exert substantial influence to the characteristics of the first optical film 40 in some cases.

Therefore, in the example shown in FIG. 1D, the area of the metal film 40M in the plan view viewed from the thickness direction of the first substrate 20 is set to be smaller than the area of the dielectric film 40E as the first optical film 40 to thereby form a step-like bump. Therefore, the coverage of the barrier film 45 in a bump section is improved, and the problem that the edge portion (the end portion) of the metal film 40M is exposed is made difficult to occur. Further, the film thickness of the barrier film 45 can be reduced, and therefore, the design of the first optical film 40 is easy.

Further, in the example shown in FIG. 1D, the dielectric film 40E as a constituent of the first optical film formed under the metal film 40M can be a dielectric multilayer film including, for example, at least one pair of $TiO_2/SiO_2$ films.

Then, a specific structural example of the etalon (the variable wavelength interference filter) will be explained. FIGS. 2A through 2C are diagrams for explaining an example of a specific structure and an action of the etalon. FIG. 2A is a diagram showing a cross-sectional structure of the etalon in the state (an initial gap G1) in which no drive voltage is applied. Further, FIG. 2B is a diagram showing a layout example of the first optical film 40 and a first electrode 60 formed on the first substrate 20. FIG. 2C is a diagram showing a cross-sectional structure of the etalon in the state (with a gap G3) in which the drive voltage is applied. The optical film structure shown in either one of FIGS. 1B through 1D is applied to an etalon 5 shown in FIGS. 2A through 2C.

In FIG. 2A, there is provided a support section 22 formed integrally with the first substrate 20, and for movably supporting the second substrate 30. The support section 22 can also be provided to the second substrate 30, or can be formed as a separate member from the first substrate 20 and the second substrate 30.

The first substrate 20 and the second substrate 30 can each be formed of, for example, a variety of types of glass such as soda glass, crystalline glass, quartz glass, lead glass, potassium glass, borosilicate glass, or alkali-free glass, or a quartz crystal. Among these materials, the glass containing alkali metal such as sodium (Na) or potassium (K) is preferable as the constituent material of each of the substrates 20, 30, and by forming the substrates 20, 30 using such glass materials, the adhesiveness with the first and second optical films 40, 50, and the first and second electrodes 60, 70, and the bonding strength between the substrates can be improved. Further, these two substrates 20, 30 are bonded by, for example, surface activated bonding with a plasma-polymerized film to thereby be integrated with each other. The first and second substrates 20, 30 are each formed to have a square shape, for example, 10 mm on a side.

The first substrate 20 is formed by, for example, processing a glass substrate, which is formed to have a thickness of 500 μm, by etching.

It should be noted that the second substrate 30 as a movable substrate has a thin wall section 34 and a thick wall section 32. Since the thin wall section 34 is provided, a desired deflection (deformation) can be generated in the second substrate 30 with a lower drive voltage. Therefore, low power consumption can be achieved.

The first optical film 40, which has, for example, a circular shape and is composed of the metal film and the barrier film covering the metal film described above, is formed at the center of an opposed surface of the first substrate 20, the opposed surface being opposed to the second substrate 30. Similarly, the second substrate 30 is formed by processing a glass substrate, which is formed to have a thickness of, for example, 200 μm, by etching. The second optical film 50 having, for example, a circular shape and opposed to the first optical film 40 is formed at the central position of an opposed surface of the second substrate 30, the opposed surface being opposed to the first substrate 20.

It should be noted that the first optical film 40 and the second optical film 50 are each formed to have, for example, a circular shape with a diameter of about 3 mm. The first optical film 40 and the second optical film 50 can each be composed of a metal film made of, for example, AgC having a narrow half bandwidth of reflectance and preferable resolution, and the barrier film for covering the metal film. The first optical film 40 and the second optical film 50 are formed using a process such as sputtering. Each of the optical films is formed to have a thickness dimension of, for example, 0.03 μm. In this embodiment, an optical film having a characteristic capable of performing dispersion in the entire visible range, for example, can be used as the first optical film 40 and the second optical film 50.

The first optical film 40 and the second optical film 50 are disposed so as to be opposed to each other across a first gap (the initial gap) G1 in a non-voltage application state shown in FIG. 2A. It should be noted that although it is assumed here that the first optical film 40 is a fixed mirror, and the second optical film 50 is a movable mirror, it is also possible to reverse the relationship, or to assume that the both are movable mirrors.

In a plan view viewed from the thickness direction of the first substrate 20, the first electrode 60 is formed in the periphery of the first optical film 40. It should be noted that in the following explanation, the plan view denotes the case of viewing the substrate plane in the substrate thickness direction of each of the substrates. Similarly, the second electrode 70 is formed on the second substrate 30 so as to be opposed to the first electrode 60. The first electrode 60 and the second electrode 70 are disposed so as to be opposed to each other across a second gap G2. It should be noted that each of the surfaces of the first electrode 60 and the second electrode 70 can be covered by an insulating film.

As shown in FIG. 2B, the first electrode 60 does not overlap the first optical film 40 in the plan view. Therefore, the optical characteristics of the first optical film 40 can easily be designed. The same can be applied to the second electrode 70 and the second optical film 50.

Further, by applying a common potential to the second electrode 70 and the voltage to the first electrode 60, an electrostatic force (here, an electrostatic attractive force) F1 indicated by arrows can be generated between the electrodes as shown in FIG. 2C. In other words, the first electrode 60 and the second electrode 70 constitute an electrostatic actuator 75. The gap between the first optical film 40 and the second optical film 50 can be controlled variably to be a gap (G3) smaller than the initial gap (G1) due to the electrostatic attractive force F1. The wavelength of the transmitted light is determined in accordance with the dimension of the gap between the optical films. Therefore, it becomes possible to select the transmission wavelength by varying the gap.

It should be noted that as indicated by thick lines in FIG. 2A, a first wiring line 61 is connected to the first electrode 60, and a second wiring line 71 is connected to the second electrode 70. Further, the first wiring line 61 and the second wiring line 71 are connected to the ground.

As described above, in this embodiment, the metal film constituting the first optical film 40 is covered by the barrier film 45 not only in the surface but also in the edge portion. Therefore, the deterioration (e.g., oxidization and sulfurization) of the reflectance of the metal film can be prevented.

Further, the barrier film 45 can be provided to at least one of the first and second optical films 40, 50, or can be provided to both of the optical films.

Further, since the barrier film 45 has conductivity, it becomes possible to release the charges on the surfaces of the optical films via the first wiring line 61 and the second wiring line 71, and thus, the accumulation of static electricity on the surfaces of the optical films can be prevented. Therefore, it becomes possible to maintain the function as the optical film having the light transmissivity in the etalon 5 for a longer period of time compared to the case in which the metal film is exposed. Therefore, the reliability of the etalon 5 is enhanced.

Second Embodiment

Then, an optical module and an electronic apparatus using the etalon explained in the first embodiment described above will be explained. In the second embodiment, a colorimetric device for measuring the chromaticity of a measurement object will be explained as an example.

Figure 3:
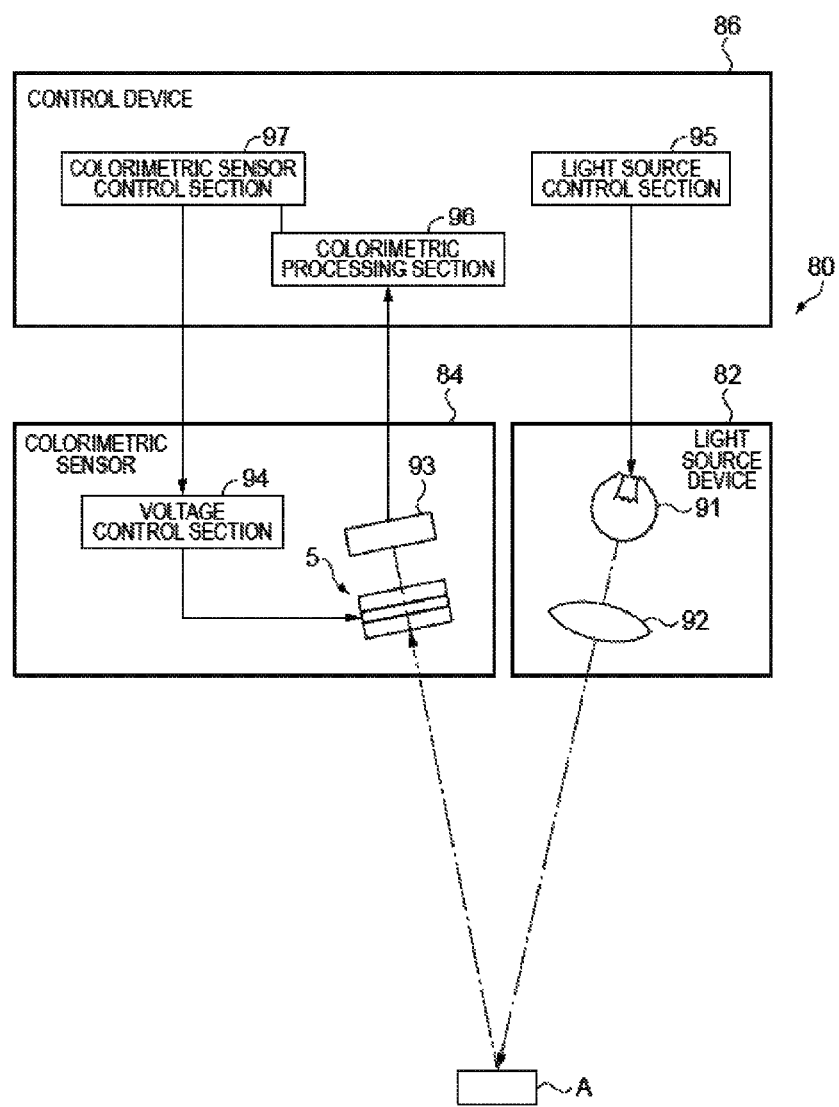
FIG. 3 is a block diagram showing a configuration of a colorimetric device as an electronic apparatus according to a second embodiment of the invention.

FIG. 3 is a block diagram showing a configuration of the colorimetric device.

A colorimetric device 80 is provided with a light source device 82 for irradiating a test object A with the light, a colorimetric sensor 84 (an optical module), and a control device 86 for controlling an overall function of the colorimetric device 80.

The colorimetric device 80 is a device for irradiating the test object A with the light from the light source device 82, receiving the test target light reflected by the test object A using the colorimetric sensor 84, and analyzing and then measuring the chromaticity of the test target light based on a detection signal output from the colorimetric sensor 84.

The light source device 82 is provided with a light source 91 and a plurality of lenses 92 (one of the lenses is shown alone in FIG. 3), and emits white light to the test object A. Further, the plurality of lenses 92 can include a collimator lens, and in this case, the light source device 82 converts the light emitted from the light source 91 into parallel light with the collimator lens, and emits it from a projection lens not shown toward the test object A.

It should be noted that although in this embodiment the colorimetric device 80 provided with the light source device 82 is described as an example, in the case in which, for example, the test object A is a light emitting member, it is also possible to configure the colorimetric device without providing the light source device 82.

The colorimetric sensor 84 as the optical module is provided with the etalon (a variable wavelength interference filter) 5, a voltage control section 94 for controlling the voltage applied to an electrostatic actuator to thereby vary the wavelength of the light to be transmitted by the etalon 5, and a light receiving section 93 (a detection section) for receiving the light transmitted through the etalon 5.

Further, the colorimetric sensor 84 is provided with an optical lens (not shown) for guiding the reflected light (the test target light), which is reflected by the test object A, to the etalon 5. Further, the colorimetric sensor 84 disperses the test target light having entered the optical lens into the light in a predetermined wavelength band with the etalon 5, and the light thus dispersed is received by the light receiving section 93.

The light receiving section 93 is formed of a photoelectric conversion element such as a photodiode as the detection section, and generates an electric signal corresponding to the received light intensity. Further, the light receiving section 93 is connected to the control device 86, and outputs the electric signal thus generated to the control device 86 as a light reception signal.

The voltage control section 94 controls the voltage to be applied to the electrostatic actuator based on the control signal input from the control device 86.

The control device 86 controls an overall function of the colorimetric device 80. As the control device 86, a general-purpose personal computer, a handheld terminal, and a colorimetry-dedicated computer can be used.

Further, the control device 86 is configured including a light source control section 95, a colorimetric sensor control section 97, and a colorimetric processing section 96 (an analysis processing section).

The light source control section 95 is connected to the light source device 82. Further, the light source control section 95 outputs a predetermined control signal to the light source device 82 based on, for example, a setting input by a user to thereby make the light source device 82 emit a white light with a predetermined brightness.

The colorimetric sensor control section 97 is connected to the colorimetric sensor 84. Further, the colorimetric sensor control section 97 sets the wavelength of the light to be received by the colorimetric sensor 84 based on, for example, the setting input by the user, and then outputs the control signal, which instructs the detection of the intensity of the received light with the wavelength thus set, to the colorimetric sensor 84. Thus, the voltage control section 94 of the colorimetric sensor 84 sets the voltage to be applied to the electrostatic actuator based on the control signal so as to transmit the light having the wavelength desired by the user.

The colorimetric processing section 96 controls the colorimetric sensor control section 97 to vary the gap size between the optical films of the etalon 5 to thereby vary the wavelength of the light to be transmitted through the etalon 5. Further, the colorimetric processing section 96 obtains the light intensity of the light transmitted through the etalon 5 based on the light reception signal input from the light receiving section 93. Then, the colorimetric processing section 96 calculates the chromaticity of the light reflected by the test object A based on the intensity values of the components of the received light having the respective wavelengths obtained in such a manner as described above.

As described above, since the colorimetric device 80 as the electronic apparatus according to this embodiment and the colorimetric sensor 84 as the optical module have the etalon 5, which is capable of accurately setting the gap dimension between the optical films, and is superior in spectral accuracy, a colorimetric sensor with good accuracy can be obtained.

As described herein above, although the colorimetric device 80 is exemplified in the second embodiment as the electronic apparatus, the variable wavelength interference filter, the optical module, and the electronic apparatus can be used in a variety of fields besides the above.

For example, they can be used as an optically based system for detecting presence of a specific substance. As such a system, there can be cited a gas detection device such as an in-car gas leak detector, which adopts a spectroscopic measurement system using the etalon, and detects a specific gas with high sensitivity, and an opto-acoustic noble-gas detector for breath-testing.

Third Embodiment

An example of the gas detection device will hereinafter be explained with reference to the accompanying drawings.

Figure 4:
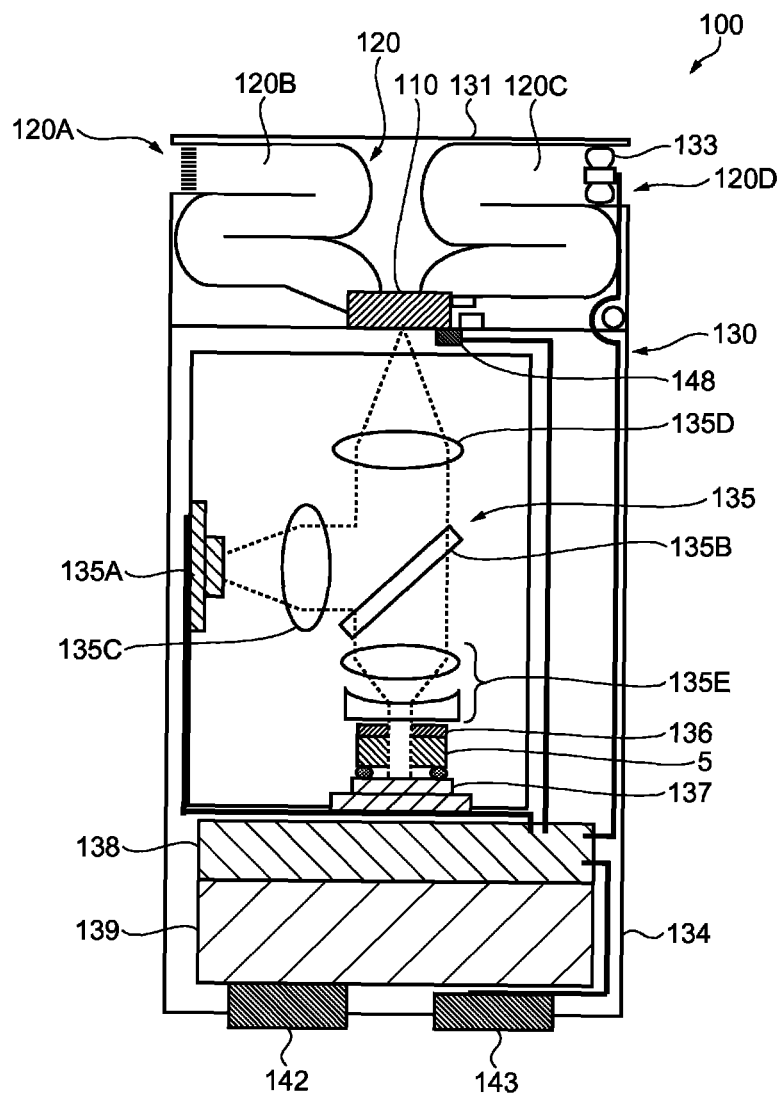
FIG. 4 is a cross-sectional view showing a configuration of a gas detection device as an electronic apparatus according to a third embodiment of the invention.

FIG. 4 is a cross-sectional view showing an example of the gas detection device provided with the etalon.

Figure 5:
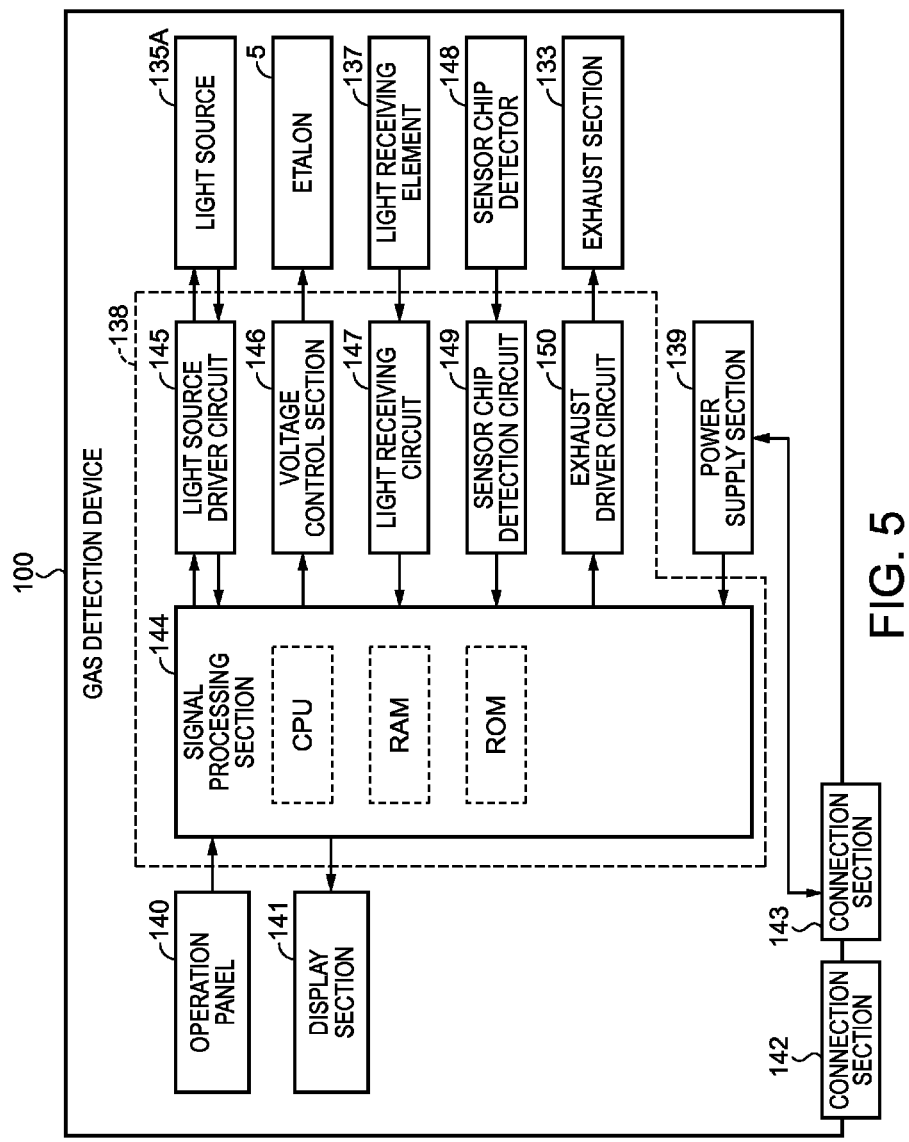
FIG. 5 is a circuit block diagram of the gas detection device according to the third embodiment.

FIG. 5 is a block diagram showing a configuration of a control system of the gas detection device.

As shown in FIG. 4, a gas detection device 100 is configured including a sensor chip 110, a channel 120 provided with a suction port 120A, a suction channel 120B, an exhaust channel 120C, and an exhaust port 120D, and a main body section 130.

The main body section 130 is composed of a detection section (an optical module) including a sensor section cover 131 having an opening to which the channel 120 is detachably attached, an exhaust section 133, a housing 134, an optical section 135, a filter 136, the etalon (the variable wavelength interference filter) 5, alight receiving element 137 (a light receiving section), and so on, a control section 138 for processing the signal thus detected and controlling the detection section, a power supply section 139 for supplying electrical power, and so on. Further, the optical section 135 is composed of a light source 135A for emitting light, a beam splitter 135B for reflecting the light, which is input from the light source 135A, toward the sensor chip 110, and transmitting the light, which is input from the sensor chip side, toward the light receiving element 137, and lenses 135C, 135D, and 135E.

Further, as shown in FIG. 5, the gas detection device 100 is provided with an operation panel 140, a display section 141, a connection section 142 for an interface with the outside, and the power supply section 139. In the case in which the power supply section 139 is a secondary cell, a connection section 143 for the battery charge can also be provided.

Further, the control section 138 of the gas detection device 100 is provided with a signal processing section 144 formed of a CPU and so on, a light source driver circuit 145 for controlling the light source 135A, a voltage control section 146 for controlling the etalon 5, a light receiving circuit 147 for receiving the signal from the light receiving element 137, a sensor chip detection circuit 149 for receiving a signal from a sensor chip detector 148 for reading a code of the sensor chip 110 and detecting the presence or absence of the sensor chip 110, an exhaust driver circuit 150 for controlling the exhaust section 133, and so on.

Then, the behavior of the gas detection device 100 will hereinafter be explained.

The sensor chip detector 148 is disposed in the sensor section cover 131 in an upper part of the main body section 130, and the sensor chip detector 148 detects the presence or absence of the sensor chip 110. When detecting the detection signal from the sensor chip detector 148, the signal processing section 144 determines that it is the condition in which the sensor chip 110 is attached, and outputs a display signal for displaying the fact that the detection operation can be performed to the display section 141.

Then, if, for example, the user operates the operation panel 140, and the operation panel 140 outputs an instruction signal indicating that the detection process will be started to the signal processing section 144, the signal processing section 144 firstly outputs a signal for operating the light source to the light source driver circuit 145 to thereby operate the light source 135A. When the light source 135A is driven, the light source 135A emits a stable laser beam, which has a single wavelength and is a linearly polarized light. Further, the light source 135A incorporates a temperature sensor and a light intensity sensor, and information thereof is output to the signal processing section 144. Then, if the signal processing section 144 determines that the light source 135A is operating stably, based on the temperature and the light intensity input from the light source 135A, the signal processing section 144 controls the exhaust driver circuit 150 to operate the exhaust section 133. Thus, a gaseous sample including the target material (gas molecules) to be detected is guided from the suction port 120A to the suction channel 120B, the inside of the sensor chip 110, the exhaust channel 120C, and the exhaust port 120D.

Further, the sensor chip 110 is a sensor incorporating a plurality of sets of metal nano-structures, and using localized surface plasmon resonance. In such a sensor chip 110, an enhanced electric field is formed between the metal nano-structures due to the laser beam, and when the gas molecules enter the enhanced electric field, Raman scattered light including information of the molecular vibration, and Rayleigh scattered light are generated.

The Rayleigh scattered light and the Raman scattered light pass through the optical section 135 and then enter the filter 136, and the Rayleigh scattered light is separated by the filter 136, and the Raman scattered light enters the etalon 5. Then, the signal processing section 144 controls the voltage control section 146 to adjust the voltage to be applied to the etalon 5 to thereby make the etalon 5 disperse the Raman scattered light corresponding to the gas molecules to be the detection object. Subsequently, if the light thus dispersed is received by the light receiving element 137, the light reception signal corresponding to the received light intensity is output to the signal processing section 144 via the light receiving circuit 147.

The signal processing section 144 compares spectrum data of the Raman scattered light corresponding to the gas molecules of the detection object obtained in such a manner as described above with the data stored in the ROM to thereby determine whether or not it is the target gas, and thus the substance is identified. Further, the signal processing section 144 makes the display section 141 display result information, or outputs it from the connection section 142 to the outside.

It should be noted that although in FIGS. 4 and 5, the gas detection device 100 for dispersing the Raman scattered light with the etalon 5, and performing the gas detection based on the Raman scattered light thus dispersed is cited as an example, it is also possible to use it as a gas detection device for identifying the gas type by detecting the absorbance unique to the gas. In this case, the gas is made to flow into the sensor, and the gas sensor for detecting the light absorbed by the gas in the incident light is used as the optical module according to the invention. Further, the gas detection device 100 for analyzing and determining the gas flowing into the sensor using such a gas sensor is cited as the electronic apparatus according to the invention. It is possible to detect the composition of the gas using the etalon according to the invention with such a configuration.

Further, as the system for detecting the presence of the specific substance, besides the gas detection described above, there can be cited a substance composition analysis device such as a non-invasive measurement device of a sugar group using near-infrared dispersion, or a non-invasive measurement device for information about food, biological object, and minerals.

Fourth Embodiment

Then, as an example of the substance component analysis device described above, a food analysis device will be explained.

Figure 6:
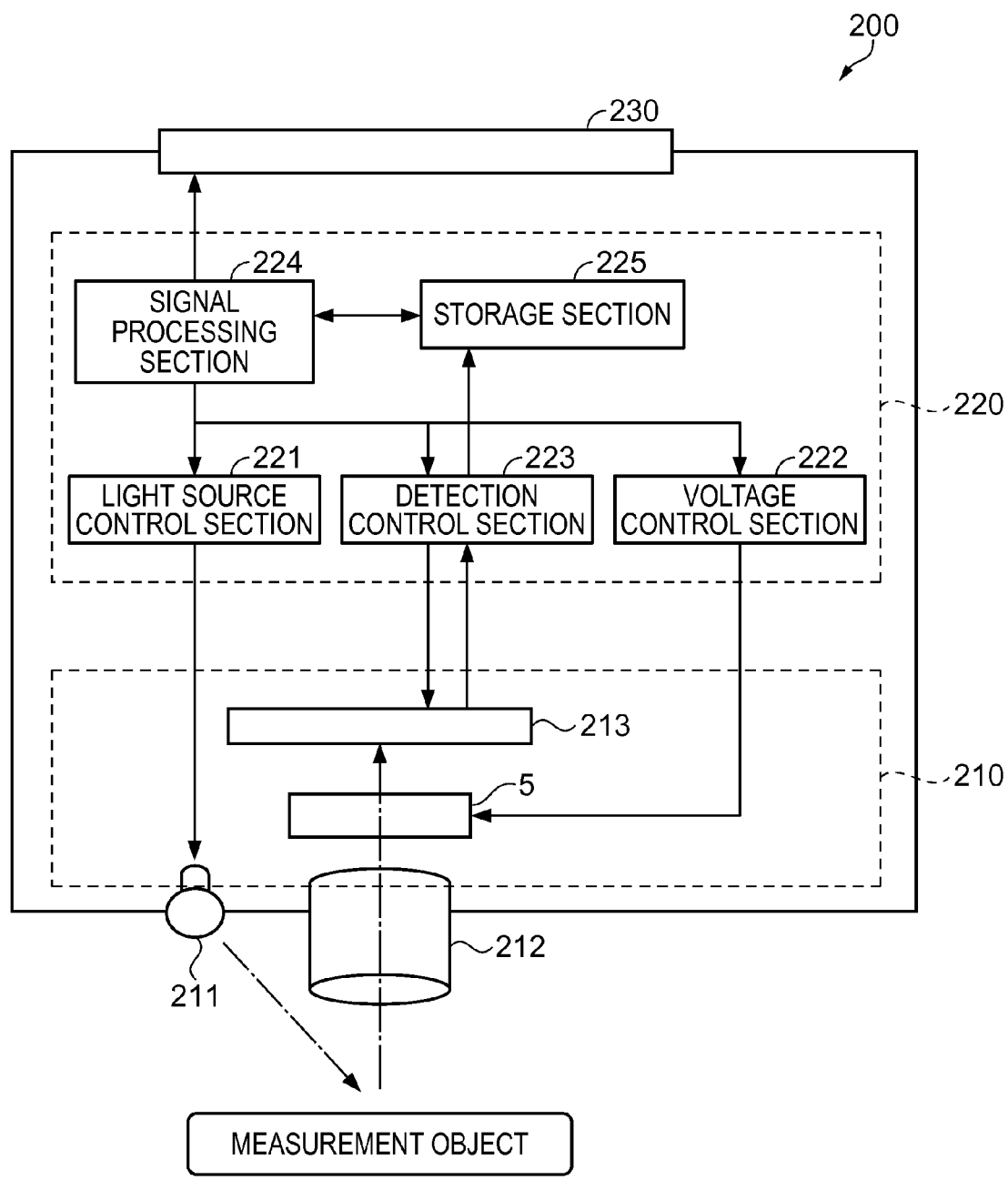
FIG. 6 is a block diagram showing a configuration of a food analyzing device as an electronic apparatus according to a fourth embodiment of the invention.

FIG. 6 is a block diagram showing a configuration of the food analysis device as an example of the electronic apparatus using the etalon 5.

A food analysis device 200 is provided with a detector (the optical module) 210, a control section 220, and a display section 230. The detector 210 is provided with a light source 211 for emitting light, an imaging lens 212 to which the light from a measurement object is introduced, the etalon 5 for dispersing the light thus introduced from the imaging lens 212, and an imaging section (light receiving section) 213 for detecting the light thus dispersed.

Further, the control section 220 is provided with a light source control section 221 for performing lighting/extinction control of the light source 211 and brightness control when lighting, a voltage control section 222 for controlling the etalon 5, a detection control section 223 for controlling the imaging section 213 and obtaining a spectral image imaged by the imaging section 213, a signal processing section 224, and a storage section 225.

In the food analysis device 200, when the device is started up, the light source control section 221 controls the light source 211, and the light source 211 irradiates the measurement object with the light. Then, the light reflected by the measurement object passes through the imaging lens 212 and then enters the etalon 5. The voltage with which the etalon 5 can disperse the light into desired wavelengths is applied to the etalon 5 under the control of the voltage control section 222, and the light thus dispersed is imaged by the imaging section 213 formed of, for example, a CCD camera. Further, the light thus imaged is stored in the storage section 225 as the spectral image. Further, the signal processing section 224 controls the voltage control section 222 to vary a voltage value to be applied to the etalon 5 to thereby obtain the spectral image corresponding to each wavelength.

Then, the signal processing section 224 performs an arithmetic process on data of each pixel in each of the images stored in the storage section 225 to thereby obtain the spectrum in each pixel. Further, the storage section 225 stores, for example, information related to a component of food corresponding to the spectrum, and the signal processing section 224 analyzes the data of the spectrum thus obtained based on the information related to the food stored in the storage section 225, and then obtains the food component and the content thereof included in the detection object. Further, the calorie of the food, the freshness thereof, and so on can also be calculated based on the food component and the content thus obtained. Further, by analyzing a spectral distribution in the image, it is possible to perform extraction of the portion with low freshness in the food as a test object, and further, it is also possible to perform detection of a foreign matter included in the food.

Then, the signal processing section 224 performs a process of making the display section 230 display the information of the components, the contents, the calorie, the freshness, and so on of the food as the test object thus obtained.

Further, FIG. 6 shows an example of the food analysis device 200. It is also possible to use substantially the same configuration as the non-invasive measurement device of other information as described above. For example, it can be used as a biological analysis device for analyzing a biological component such as measurement and analysis of a biological fluid such as blood. If a device of detecting ethyl alcohol is provided as the device of measuring the biological fluid component such as blood as an example of such a biological analysis device, the device can be used as a drunk driving prevention device for detecting the influence of alcohol to a driver of a vehicle. Further, it can also be used as an electronic endoscopic system equipped with such a biological analysis device.

Further, it can also be used as a mineral analysis device for performing component analysis of minerals.

Further, the variable wavelength interference filter, the optical module, and the electronic apparatus according to the invention can be applied to the following devices.

For example, it is also possible to transmit data with the light having each of the wavelengths by temporally varying the intensity of the light having each of the wavelengths, and in this case, it is possible to extract data transmitted with the light having a specific wavelength by dispersing the light having the specific wavelength using the etalon provided to the optical module, and then making the light receiving section receive the light. Therefore, by processing the data of the light having each of the wavelengths using the electronic apparatus equipped with such a data extracting optical module, it is also possible to perform optical communication.

Fifth Embodiment

Further, as other electronic apparatuses, the invention can also be applied to a spectroscopic camera, a spectroscopic analyzer, and so on for dispersing the light with the etalon (the variable wavelength interference filter) according to the invention, and imaging the spectral image. As an example of such a spectroscopic camera, an infrared camera incorporating the etalon can be cited.

Figure 7:
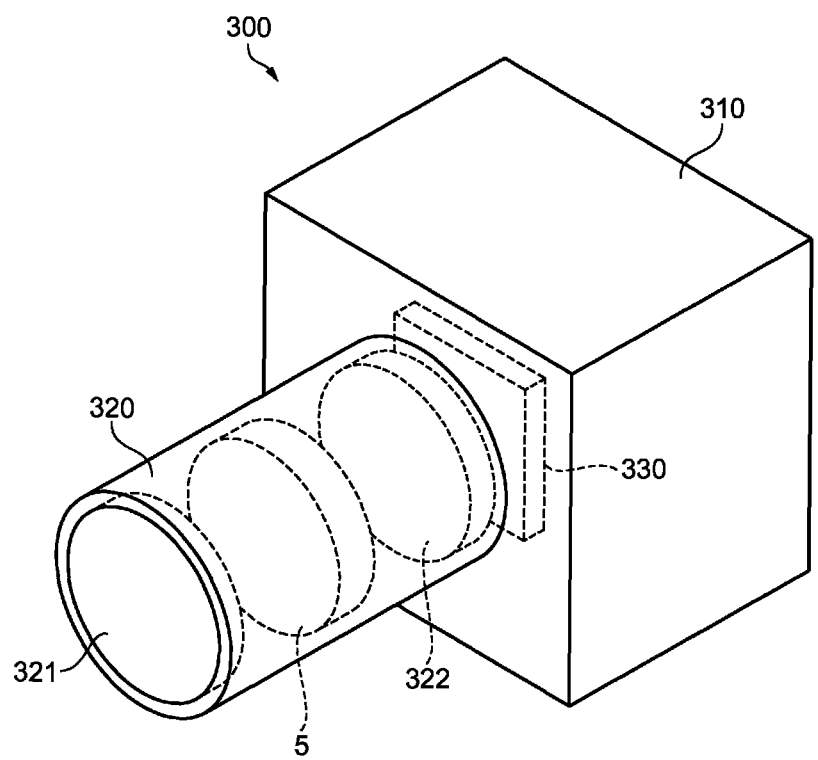
FIG. 7 is a perspective view showing a configuration of a spectroscopic camera as an electronic apparatus according to a fifth embodiment of the invention.

FIG. 7 is a perspective view showing a configuration of the spectroscopic camera. As shown in FIG. 7, a spectroscopic camera 300 is provided with a camera main body 310, an imaging lens unit 320, and an imaging section 330.

The camera main boy 310 is a part which is gripped and operated by the user.

The imaging lens unit 320 is provided to the camera main body 310, and guides the image light input thereto to the imaging section 330. Further, the imaging lens unit 320 is configured including an objective lens 321, an image forming lens 322, and the etalon 5 disposed between these lenses.

The imaging section 330 is formed of a light receiving element, and images the image light guided by the imaging lens unit 320.

In such a spectroscopic camera 300, by transmitting the light with the wavelength to be the imaging object using the etalon 5, the spectral image of the light with a desired wavelength can be imaged.

Further, the etalon according to the invention can be used as a band-pass filter, and can also be used as, for example, an optical laser device for dispersing and transmitting only the light in a narrow band centered on a predetermined wavelength out of the light in a predetermined wavelength band emitted by the light emitting element.

Further, the etalon according to the invention can be used as a biometric authentication device, and can be applied to, for example, an authentication device of blood vessels, a fingerprint, a retina, an iris, and so on using the light in a near infrared range or the visible range.

Further, the optical module and the electronic apparatus can be used as a concentration detection device. In this case, the infrared energy (the infrared light) emitted from the substance is dispersed by the etalon and is then analyzed, and the concentration of the test object in a sample is measured.

As described above, the variable wavelength interference filter, the optical module, and the electronic apparatus according to the invention can be applied to any device for dispersing predetermined light from the incident light. Further, since the light can be dispersed into a plurality of wavelength components with a single device as described above, the measurement of the spectrum of a plurality of wavelengths and detection of a plurality of components can be performed with accuracy. Therefore, compared to the exiting device of taking out desired wavelengths with a plurality of devices, downsizing of the optical module and the electronic apparatus can be promoted, and the optical module and the electronic apparatus can preferably be used for, for example, portable applications and in-car applications.

The invention is not limited to the embodiments explained hereinabove, but the specific structures and the procedures to be adopted when putting the invention into practice can arbitrarily be replaced with other structures and so on within the range in which the advantages of the invention can be achieved. Further, a variety of modifications can be made by those skilled in the art within the scope or the spirit of the invention.

The entire disclosure of Japanese Patent Application No. 2012-031441, filed Feb. 16, 2012 is expressly incorporated by reference herein.

What is claimed is:

1. An interference filter comprising:
a first optical film and a second optical film opposed to each other across a gap,
wherein at least one of the first and second optical films has a metal film, and
a surface and an edge portion of the metal film are covered by a barrier film having conductivity,
an entire edge of the metal film is disposed within a region defined by the barrier film in a plan view,
at least one of the first and second optical films includes the metal film, and another optical film on which the metal film is mounted, an area of the metal film in a plan view viewed from a thickness direction of one of the first and second optical films is smaller than an area of the another optical film,
a step is formed between the metal film and the another optical film, and
the barrier film is formed so as to cover the step.

2. The interference filter according to claim 1, wherein a resistivity of the barrier film is one of equal to and lower than $8 \times 10^7$ $\Omega \cdot$cm.

3. The interference filter according to claim 1, wherein
a material of the metal film is one of Ag alone and an alloy including Ag as a principal component, and
the barrier film is one of
  a film including one or a plurality of substances selected from a group consisting of indium-based oxides, tin-based oxides, and zinc-based oxides as a principal component, and
  a layered film obtained by stacking films each including a substance selected from the group as a principal component.

4. The interference filter according to claim 1, wherein the barrier film is a film including either one of indium tin oxide, Al doped zinc oxide, Ga doped zinc oxide, Ce doped indium oxide, zinc oxide, and tin oxide as a principal component.

5. The interference filter according to claim 1, wherein the barrier film is electrically connected to the ground.

6. The interference filter according to claim 1, wherein a tilted surface is provided to the edge portion of the metal film, and the barrier film is formed on the tilted surface.

7. The interference filter according to claim 1, wherein
the first optical film is provided to a first substrate,
the second optical film is provided to a second substrate,
the first substrate has a first electrode,
the second substrate has a second electrode, and
the gap between the first optical film and the second optical film is variably controlled by an electrostatic force generated between the first electrode and the second electrode.

8. An optical module comprising:
the variable wavelength interference filter according to claim 1; and
a detection section adapted to detect a light intensity of light transmitted through the interference filter.

9. An electronic apparatus comprising:
the variable wavelength interference filter according to claim 1;
a detection section adapted to detect a light intensity of light transmitted through the interference filter; and
a processing section adapted to perform an analysis processing based on the light intensity of the light detected by the detection section.

* * * * *